United States Patent
Rodriguez

(10) Patent No.: US 11,222,452 B2
(45) Date of Patent: Jan. 11, 2022

(54) SYSTEM AND METHOD OF AUGMENTING IMAGES OF A USER

(71) Applicant: Joshua Rodriguez, Poway, CA (US)

(72) Inventor: Joshua Rodriguez, Poway, CA (US)

(*) Notice: Subject to any disclaimer, the term of this patent is extended or adjusted under 35 U.S.C. 154(b) by 0 days.

(21) Appl. No.: 16/951,876

(22) Filed: Nov. 18, 2020

(65) Prior Publication Data

US 2021/0074042 A1    Mar. 11, 2021

Related U.S. Application Data

(63) Continuation of application No. 15/810,055, filed on Nov. 11, 2017, now abandoned.

(Continued)

(51) Int. Cl.
*G06T 11/60*    (2006.01)
*G06K 9/00*    (2006.01)
(Continued)

(52) U.S. Cl.
CPC .......... *G06T 11/60* (2013.01); *A45D 44/005* (2013.01); *G06K 9/00248* (2013.01); *G06K 9/00275* (2013.01); *G06T 7/593* (2017.01); *G06T 19/006* (2013.01); *G06T 19/20* (2013.01); *G06T 2200/24* (2013.01);
(Continued)

(58) Field of Classification Search
CPC ... G06T 19/006; G06T 2200/08; G06T 11/60; G06T 19/20; G06T 7/593; G06T 2219/2004; G06T 2219/2016; G06T 2200/24; G06T 2207/30201; G06K 9/00248; G06K 9/00275; A45D 44/005
See application file for complete search history.

(56) References Cited

U.S. PATENT DOCUMENTS 5,060,171 A * 10/1991 Steir ................ G06T 19/006
                                                        345/630
10,849,408 B2 * 12/2020 Skwarek ............. G06T 19/20
(Continued)

OTHER PUBLICATIONS

NPL Video Titled "Glasses com App for iPad", published Jul. 2013, https://www.youtube.com/watch?v=quUJ5ag3a-g; select screenshots included. (Year: 2013).

(Continued)

*Primary Examiner* — Daniel F Hajnik
(74) *Attorney, Agent, or Firm* — Kilpatrick Townsend & Stockton LLP

(57) ABSTRACT

A method to be performed by at least one computer processor forming at least a part of a computing system comprising a mobile computing device comprising a camera, the method including obtaining a set of images of a head of a user by moving the mobile computing device through one or more two- and three-dimensional paths about the head; identifying, from the set of images, landmarks of the head of the user, wherein the landmarks comprise ears, nose, eyes, eyebrows, chin, cheeks, neckline, and hairline of the user; generating, based on the identified landmarks, a user framework; and scaling and adjusting, based on the user framework, a set of hairstyles from a hairstyle database based on hair dimensions, characteristics, and color with the landmarks, the hairstyle database being synchronized with a user profile and based one or more hairstyle selections by the user.

18 Claims, 9 Drawing Sheets

Related U.S. Application Data

(60) Provisional application No. 62/421,052, filed on Nov. 11, 2016.

(51) Int. Cl.
| | | |
|---|---|---|
| *G06T 7/593* | (2017.01) | |
| *G06T 19/20* | (2011.01) | |
| *G06T 19/00* | (2011.01) | |
| *A45D 44/00* | (2006.01) | |

(52) U.S. Cl.
CPC .............. *G06T 2207/30201* (2013.01); *G06T 2219/2004* (2013.01); *G06T 2219/2016* (2013.01)

(56) References Cited

U.S. PATENT DOCUMENTS

| | | | | |
|---|---|---|---|---|
| 2005/0162419 A1* | 7/2005 | Kim | .................. | G06T 15/00 345/419 |
| 2008/0219518 A1* | 9/2008 | Steinberg | ............ | G06K 9/00281 382/118 |
| 2012/0139830 A1* | 6/2012 | Hwang | ............... | G06K 9/00302 345/156 |
| 2013/0286161 A1* | 10/2013 | Lv | .......................... | G06K 9/036 348/46 |
| 2014/0176565 A1* | 6/2014 | Adeyoola | ........... | G06F 16/5854 345/473 |
| 2014/0197922 A1* | 7/2014 | Stanwood | ............... | G06F 21/32 340/5.83 |
| 2015/0070351 A1 | 3/2015 | Tarquini et al. | | |
| 2015/0123967 A1 | 5/2015 | Quinn et al. | | |
| 2016/0063235 A1* | 3/2016 | Tussy | ....................... | G06K 9/22 726/6 |
| 2016/0210602 A1* | 7/2016 | Siddique | ............... | G06Q 20/204 |
| 2016/0284123 A1 | 9/2016 | Hare et al. | | |
| 2017/0213385 A1* | 7/2017 | Yu | ........................... | G06T 17/20 |
| 2019/0035149 A1* | 1/2019 | Chen | ........................ | G06T 7/50 |

OTHER PUBLICATIONS

NPL Video Titled "A 3D Hairstyle Database for Hair Modeling", from http://www-scf.usc.edu/-liwenhu/SHM/database.html; Web-back machine printout included showing webpage from Apr. 2016. (Year: 2016).

\* cited by examiner

SYSTEM AND METHOD OF AUGMENTING IMAGES OF A USER

CROSS REFERENCE TO RELATED APPLICATIONS

This application is a continuation of, and claims priority under 35 U.S.C. § 120 to, U.S. patent application Ser. No. 15/810,055, filed Nov. 11, 2017, which claims priority to U.S. provisional patent application No. 62/421,052, entitled "Augmenting facial images" and filed Nov. 11, 2016. The contents of the United States provisional patent application is incorporated herein by reference in its entirety as if set forth verbatim.

FIELD

The subject matter described herein relates to modifying image data and in particular modify image data containing an image of a face.

BACKGROUND

Determining hairstyles that suit a person can be challenging. A customer of a salon may not know the hairstyle they would like because they do not know whether the hairstyle will suit their face. The solution of this disclosure resolves these and others of the art.

SUMMARY

In one aspect, a method is provided. The method can include obtaining a set of images of a body part of a user, such as the head. Landmarks for the body party of the user can be identified in the images. A user framework can be generated based on the identified landmarks. A set of aesthetic expressions (e.g., hairstyles, tattoos, articles of clothing, etc.) can be selected, customized, adjusted, and/or scaled based on the user framework. In those embodiments where the hairstyle is the aesthetic expression, the selecting, customizing, adjusting, and/or scaling of the set of hairstyles conforming the set of hairstyles to the size and shape of the head of the user in the set of images. An image of the user's body part can be displayed on a user device. The image of the user's body part can be augmented with at least one set of the hairstyles.

In some embodiments, a system and method is disclosed to be performed by at least one computer processor forming at least a part of a computing system. The method can include obtaining a set of images of a body part of a user; identifying, from the set of images, landmarks of the body part of the user; generating, based on the identified landmarks, a user framework; adjusting, based on the user framework, a set of aesthetic expressions; and displaying, on a display device, an image of the user's body part augmented with at least one set of aesthetic expressions.

In some embodiments, the body part is a head and the aesthetic expressions are hairstyles.

In some embodiments, the aesthetic expressions are accessible in a database that is synchronized with a publicly and/or privately available database of aesthetic expressions according to one or more user identified criteria. The criteria can include aesthetic expressions of celebrities, social media, criteria of contacts within a network, network suggested criteria based on user information (e.g., age, ethnicity, nationality, gender, user or system identified trends), and the like.

In some embodiments, the body part is a location on the user for receiving a tattoo and the aesthetic expressions are tattoos.

In some embodiments, the computing system is a mobile computing device comprising a camera, wherein the set of images are obtained by moving the mobile computing device through one or more two- and/or three-dimensional paths about the body part.

In some embodiments, the method includes presenting an instruction on the display device that causes the user to maintain the mobile computing device at one location relative to a predetermined location of the body part; and positioning the camera of the mobile computing device towards the predetermined location to obtain the set of images.

In some embodiments, the method includes communicating an indication, by the mobile communications device, to the user regarding an output associated with analyzing the set of images and/or the aesthetic expression.

In some embodiments, the method includes maintaining the mobile computing device at one location relative to a predetermined location of the body part; positioning the camera of the mobile computing device towards the predetermined location to obtain the set of images; and moving the body part across a predetermined path or across a plurality of different body part orientations. The step of moving can include starting the moving of the mobile device behind a lateral midline of the body part; and terminating the moving of the mobile device at a location different than the lateral midline of the body part. The step of moving can include positioning the mobile device along a plurality of predetermined positions along a predetermined three-dimensional path. In some embodiments, the plurality of positions are determined automatically or manually by analyzing the set of images and identifying one or more landmarks of the body part of the user.

In some embodiments, the method includes stitching together the set of images; and forming the user framework with a three-dimensional map of the user's body part. The three-dimensional map can include the landmarks detected by analyzing the set of images that are associated with the body part. The map can include a multi-color graphic with indicators associated with the one or more landmarks In some embodiments, the body part is the head and the one or more landmarks include one or more features of the head.

In some embodiments, a method and system is disclosed to be performed by at least one computer processor forming at least a part of a computing system. The method includes obtaining a set of images of a body part of a user; identifying, from the set of images, landmarks of the body part of the user; generating, based on the identified landmarks, a user framework; adjusting, based on the user framework, a set of aesthetic expressions; selecting, by the user, an aesthetic expression from the set of aesthetic expressions; displaying, on a display device, an image of the user's body party augmented with the selected aesthetic expression.

In some embodiments, the computing system is a mobile computing device having the display device, wherein selecting, by the user, is communicated in a graphical user interface of the display device.

In some embodiments, steps of the method are stored in a set of instructions in a non-transitory computer readable storage medium of the computing system.

In some embodiments, the body part is a head and the aesthetic expressions are hairstyles, and wherein the hairstyles comprising a three-dimensional framework that is adjusted to the user framework.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a smartphone application, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

The ubiquity of smartphone technology has enabled the automation and/or the simplification of many aspects of our day-to-day lives. One of the exceptions is the ability to augment an image of a user of a mobile device to determine a preferred style.

The presently described subject matter is directed to obtaining one or more images of a user of a mobile device, using a camera of the mobile device, to facilitate augmenting that image with different preselected styles to determine a preferred style by the user.

In this application, the term "aesthetic expression" can mean a hairstyle, makeup, a tattoo, an article of clothing on a user, jewelry, or the like.

Figure 1:
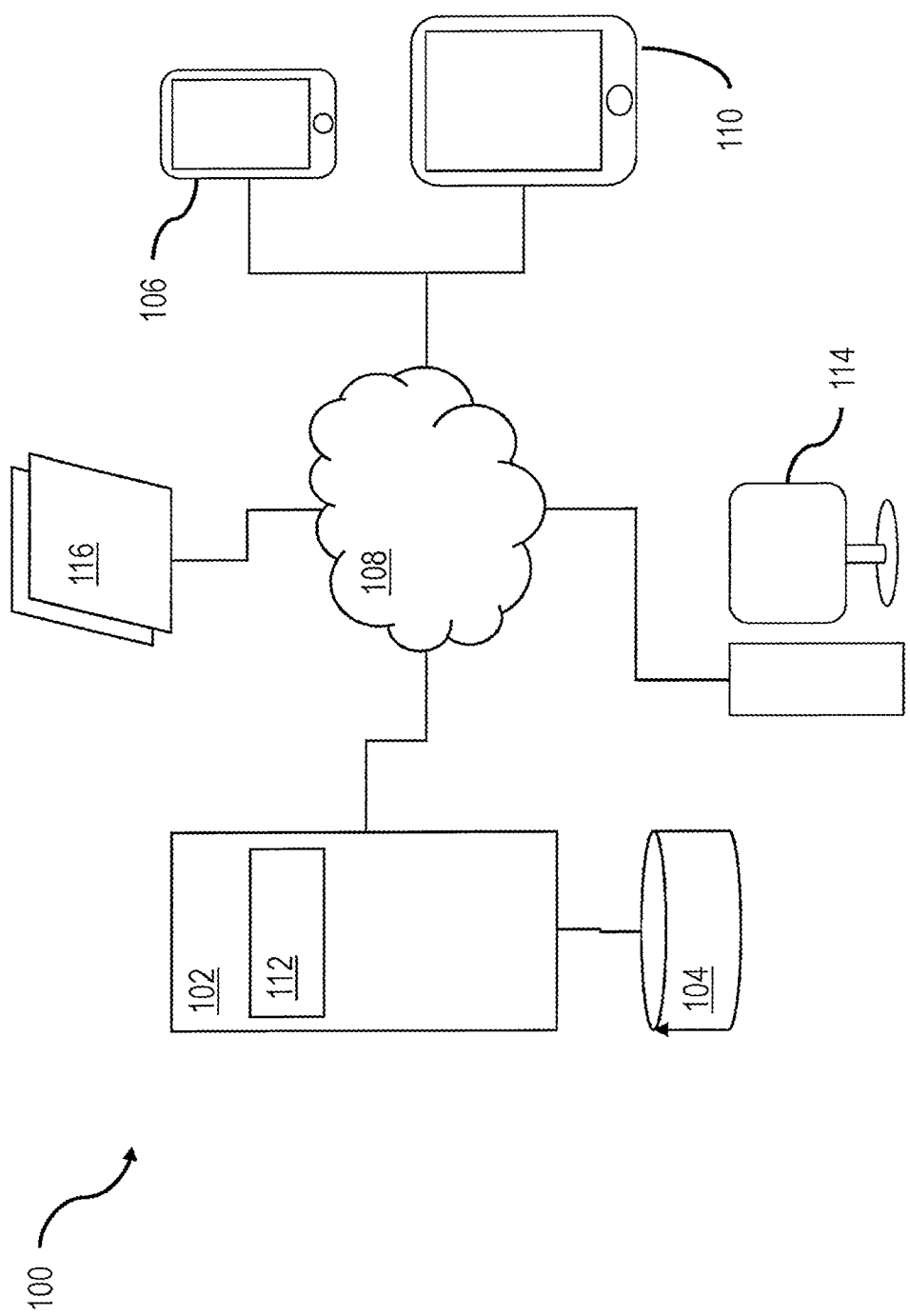
FIG. 1 is an illustration of a system having one or more features consistent with the present description.

FIG. 1 is an illustration of a system 100 having one or more features consistent with the present description. The system 100 can include a server 102. The server 102 can include a memory 104. The memory 104 can include a database. The memory 104 can include one or more styles with which to augment an image(s) of a user of a mobile device. The system 100 can include a mobile computing device 106. The mobile computing device 106 can be associated with a user. The mobile computing device 106 can include memory. The memory can be configured to store computer-readable instructions forming an application for execution on the mobile computing device 106. The mobile computing device 106 can be configured to facilitate analysis of a body part such as the head and selection of an aesthetic expression (e.g., a hairstyle) for the user of the mobile computing device 106. It is to be understood that any of the herein disclosed embodiments could also be applied to other areas for scaling, adjusting, customizing, or otherwise selecting appearance of a user, including tattoos on a body part, one or more clothes on a user, or the like. For example, any of the herein disclosed system and methods could be configured so an end-user can scan a body part and then select a tattoo for placement on the body part.

In certain embodiments, to facilitate selection of an aesthetic expression such as a hairstyle for the user, the mobile computing device 106 can be configured to obtain one or more images of the user's head. The mobile computing device 106 can be configured to facilitate augmenting of the image of the user's head with various hairstyles.

The mobile computing device 106 can include a camera. The mobile computing device 106 can be configured to use the camera to obtain an image of the user's head. The mobile computing device 106 can be configured to obtain a panoramic image of the user's head. Instructions can be provided to the user by the application through a display of the mobile computing device 106. The mobile computing device 106 can be configured to obtain images of the user's head in a number of different ways. The application can be configured to present instructions to the user consistent with the different ways of obtaining images of the user's head.

Figure 2:
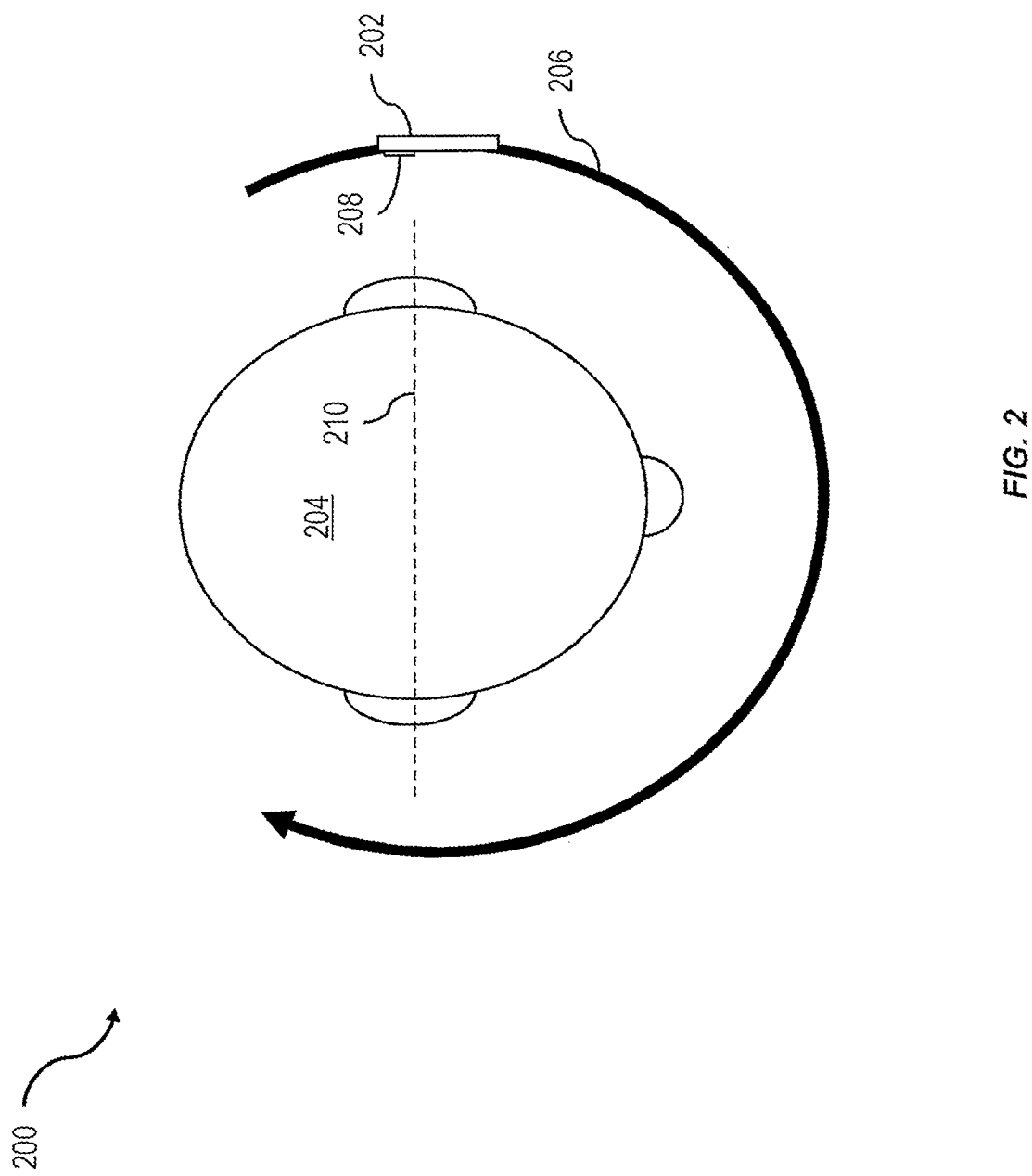
FIG. 2 is an illustration of using the mobile device to capture an image of the user 204 associated with the mobile device.

FIG. 2 is an illustration of using the mobile device 202 to capture an image of the user 204 associated with the mobile device 202. In the example illustrated in FIG. 2, the mobile computing device 202 the user can move the mobile computing device 202 through one or more two- and/or three-dimensional paths 206 about the user's head. In certain embodiments, the images obtained by the mobile computing device 202 can include a plurality of images that are capable of being stitched together to form a three-dimensional map of the user's head. When the mobile computing device 202 is moved through the path 206, the camera 208 can be directed toward and/or about the user 204. In some variations, the path 206 may start and end behind the lateral midline 210 of the head of the user 204. In other variations, the path 206 may start and end at some other point, for example, at the lateral midline 210 of the head of the user 204.

The mobile computing device 202 can be configured to obtain a plurality of images as it is moved along the path 206. The mobile computing device 202 can be configured to take images at set points along the path 206 (e.g., a combination of one or more of x, y, and z coordinates). For example, the application running on the mobile computing device 202 can be configured to determine that the mobile computing device 202 is at a particular location along the path 206 and cause the camera 208 to obtain an image of the head of the user 204 at that location. The particular location(s) in certain embodiments can be determined automatically or manually by one or more landmarks of the head of the user. Examples of landmarks can include the user's ears, eyes, nose, mouth, chin, forehead, cheeks, eye brows, eye lashes, and/or the like. The mobile computing device 202 can be configured to use the landmarks as base locations in a predetermined set order to determine where the mobile computing device 202 is along the path 206. For example, in one embodiment, the path 206 may consist moving from the left ear of the user 204, then to the nose and mouth, and then to the right ear of the user.

Figure 3:
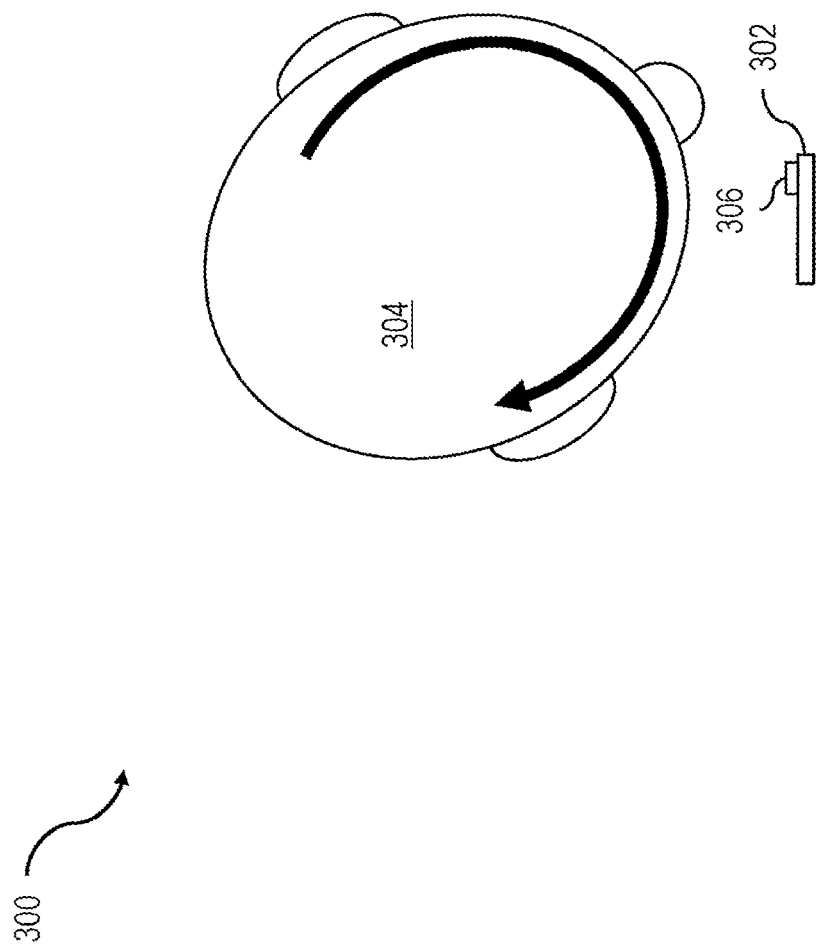
FIG. 3 is an illustration of using the mobile computing device to capture an image of the user associated with the mobile computing device.

FIG. 3 is an illustration of using the mobile computing device 302 to capture an image of the user 304 associated with the mobile computing device 302. In this example, the user is instructed to keep the mobile computing device 302 at one location with the camera 306 of the mobile computing device 302 pointing toward the user 304. The application can cause an instruction to be presented to the user on a display of the mobile computing device 302. The instruction can instruct the user to move their body part(s) (e.g., rotate their head) with the camera 306 pointed toward them.

Figure 4:
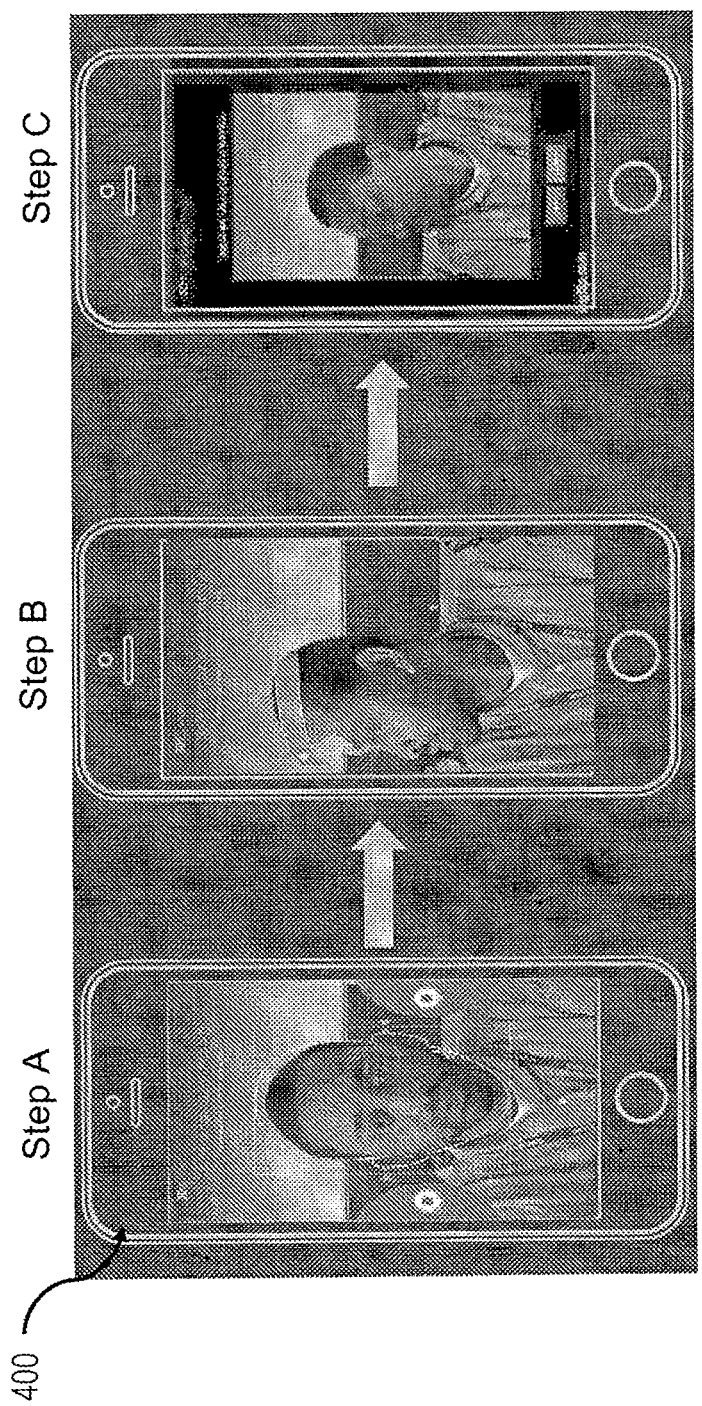
FIG. 4 illustrates a graphical user interface of a system having one or more features consistent with the present description.

FIG. 4 illustrates a graphical user interface of a system having one or more features consistent with the present description. In some variations, the mobile computing device 106, as illustrated in FIG. 1, can be configured to request that the user position the mobile computing device 106 at a particular location relative to the user's body part. In step (a), the user is prompted by the display of device 106 to move his body part (e.g., head) to one or more positions or along a predetermined path. In step (b), the user has begun moving his head along the one or more positions or along the predetermined path. Once positioned in accordance with the instructions, at step (c), an indication will be communicated to the user via the display of device 106. It is understood that the instructions of FIG. 4 can be only one position by the user or can be the user moving between a plurality of positions or moving through a pre-determined path. Whether only one or the plurality of positions and/or the pre-determined path, the user can be notified once the device 106 has captured the information so as to communicate its output in step (c). While a male individual is depicted in FIG. 4, any person or mammal, including any gender, is also contemplated for use in this particular embodiment.

Referring back to FIG. 1. In some variations, the mobile computing device 106 can be configured to use the obtained images of the user's body part to generate a user framework.

In other variations, the mobile computing device 106 can be configured to transmit the images of the user's body part to a server 102. The mobile computing device 106 can be in electronic communication with a server 102 through a network 108, such as the Internet. The server 102 can be configured to generate a two- and/or three-dimensional user framework. A user framework can be a two- and/or three-dimensional framework of a user's head that include an output map that depicts the user's body part (e.g., the user's head) with one or more detected landmarks. The output may also be a multi-color graphic with indicators associated with characteristics of the one or more detected landmarks. To generate the framework of the user's head, the images of the user's head can be used to determine the dimensions of the user's head, including dimensions and spatial arrangement of one or more detected landmarks. The framework can include an indication of the relative positions and sizes of various elements of the user's head, including one or more detected landmarks. For example, the user framework can include an indication of the relative position, size and/or shape of landmarks such as the user's ears, nose, eyes, neck, skull, cheeks, eyebrows, hairline, or the like.

The user framework can be used by the mobile computing device 106 and/or the server 102 to scale, adjust, or otherwise customize aesthetic expressions (e.g., hairstyles) of an aesthetic expression repository (e.g., a database of hairstyles, tattoos, clothes, jewelry etc.). Aesthetic expressions can be stored in one or more of the mobile computing device 106, the server 102, memory 104, or the like.

In those embodiments, where aesthetic expressions are hairstyles, each hairstyle stored in the hairstyle repository may have a hairstyle framework. The hairstyle framework can include an indication of the relative positions of various elements of the hairstyle framework. Certain elements of the hairstyle framework may be married with the relative positions of a user framework. Certain elements of the hairstyle framework may be customized by or for the user, including hair dimensions, characteristics, and/or color with the relative positions of a user framework. By scaling, adjusting, and/or customizing the hairstyle framework with the user framework, individual hairstyles can be scaled, adjusted, and/or customized to individual users.

Figure 5:
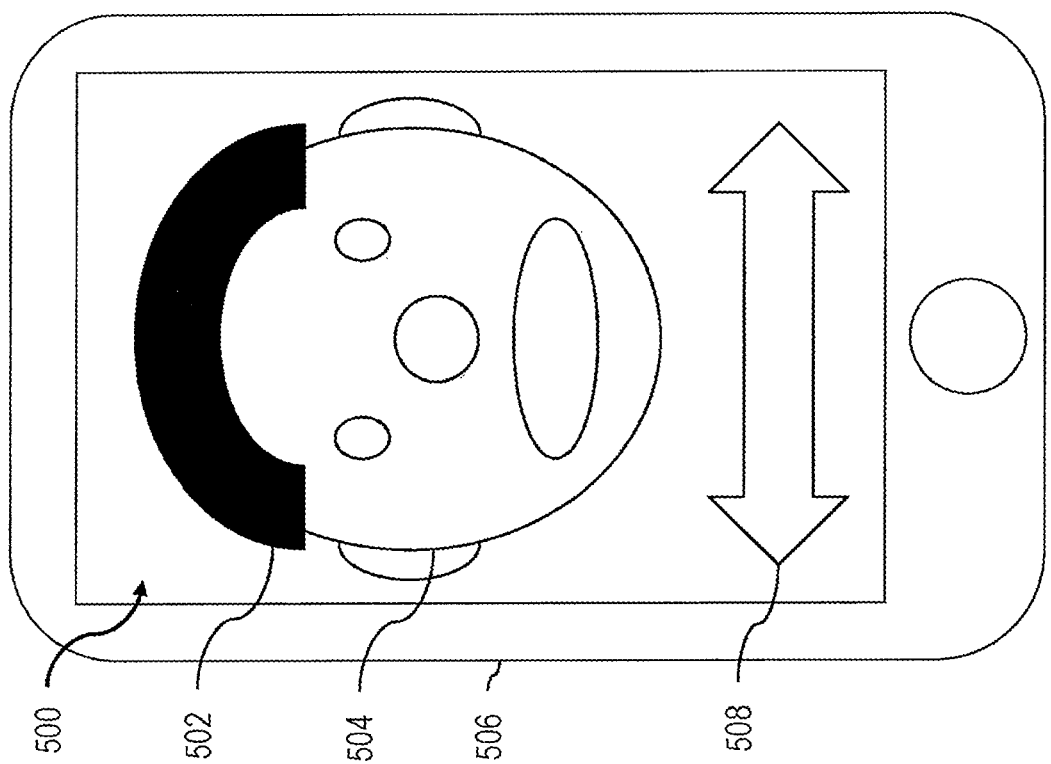
FIG. 5 is an illustration of a graphical user interface having one or more features consistent with the present description.

Following scaling, adjustment, and/or customization, the hairstyles in the hairstyle repository can be scaled, adjusted, customized, and/or presented to the user. FIG. 5 is an illustration of a graphical user interface 500 having one or more features consistent with the present description. The graphical user interface 500 can be configured to present hairstyles 502 on an image 504 of a user's head. The hairstyles 502 presented to the user on the graphical user interface 500 can be scaled to the user's head, including one or more landmarks detected thereon, thereby appearing as having the proper size and shape. If the mobile computing device 506 has a touchscreen display, a user can modify or customize a presented hairstyle (e.g., modify one or more characteristics of the presented hairstyle), and/or scroll through various hairstyles by swiping on the screen of the touchscreen display, interacting with an on screen element 508, or the like.

The mobile computing device 506 can be configured to facilitate rotating of the two- and/or three-dimensional image 504 of the head of the user. The mobile computing device 506 can include a touchscreen. In response to an input from a user, through the touchscreen, the image 504 of head of the user can be rotated to see the sides, back, or the like of the image 504 of the head of the user.

In some variations, a user may select a subset of hairstyles prior displaying them on an image of the user's head. In response to selection of a subset of hairstyles of a hairstyle repository, only the subset of hairstyles may be scaled using the user framework. In some embodiments, instead of hairstyles the subset can include clothes or tattoos or the like to facilitate a user's selection.

Figure 6:
FIG. 6 is an illustration of a graphical user interface having one or more features consistent with the present description.

In some variations, the application can be configured to facilitate selection of a hairstyle from a hairstyle gallery. FIG. 6 is an illustration of a graphical user interface having one or more features consistent with the present description. FIG. 6 illustrates a graphical user interface where a user can choose to select a subset of various hairstyles. Selections can include, for example, facial hairstyles, male hairstyles, female hairstyles or the like. Selections can also include, the length of the hair, the style of the hair, the color of the hair, the type of the hair, or the like. In some variations, a user can sort their hairstyle lists by various celebrities, or search for a particular celebrity to select their hairstyle.

Figure 7:
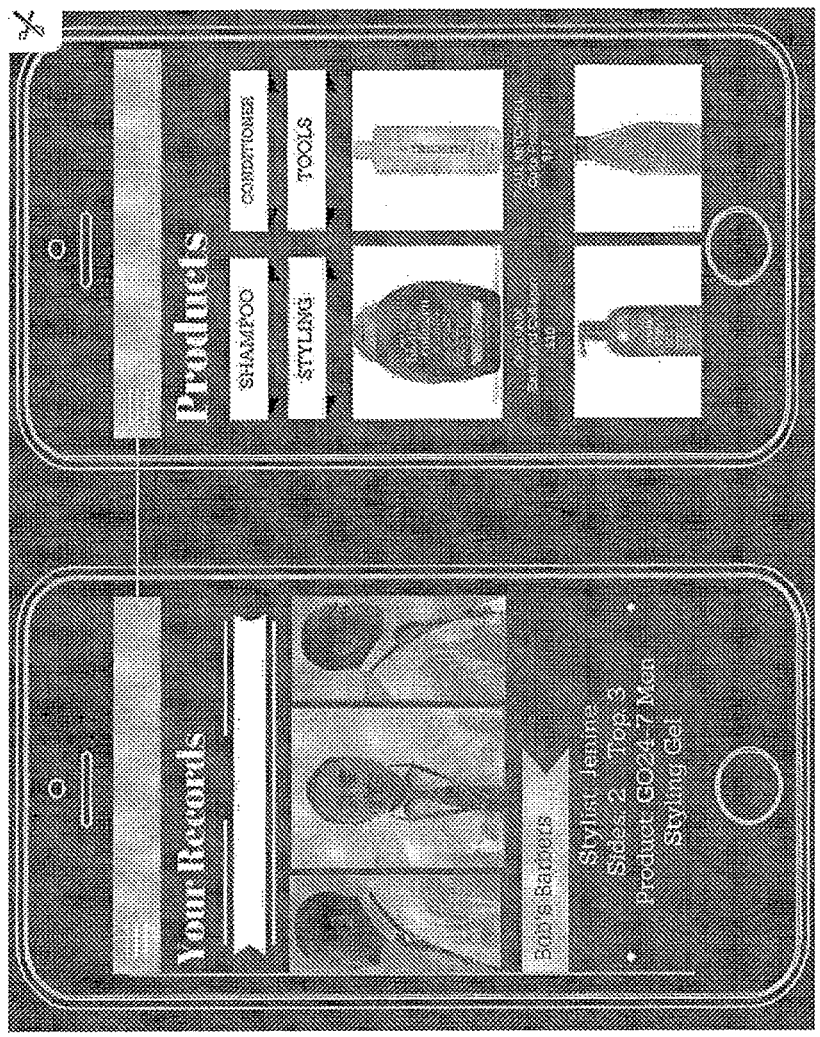
FIG. 7 is an illustration of a graphical user interface have one or more features consistent with the present description.

FIG. 7 is an illustration of a graphical user interface 700 have one or more features consistent with the present description. The graphical user interface 700 can include a user profile. A user of the present application can save hairstyles to their profile. The user profile can include information about a user's stylist, products used by the user, products used by the stylist for the user, or the like.

When a user selects hairstyles, a user profile may be updated on a server 102. A companion application may be available to a stylist. For example, a stylist may be using another mobile computing device 110. The stylist may be able to access the user's saved hairstyles and review them with the user. When a stylist uses products on a user during an appointment, the stylist may provide an indication through the companion application that they have applied that product, or used a particular tool when styling the user's hair. This can then appear in the user's profile.

The application may be configured to facilitate purchase of the product by the user. A revenue sharing scheme can be implemented whereby the stylist receives a share of the revenue generated through the user's purchase of the products through the application.

Figure 8:
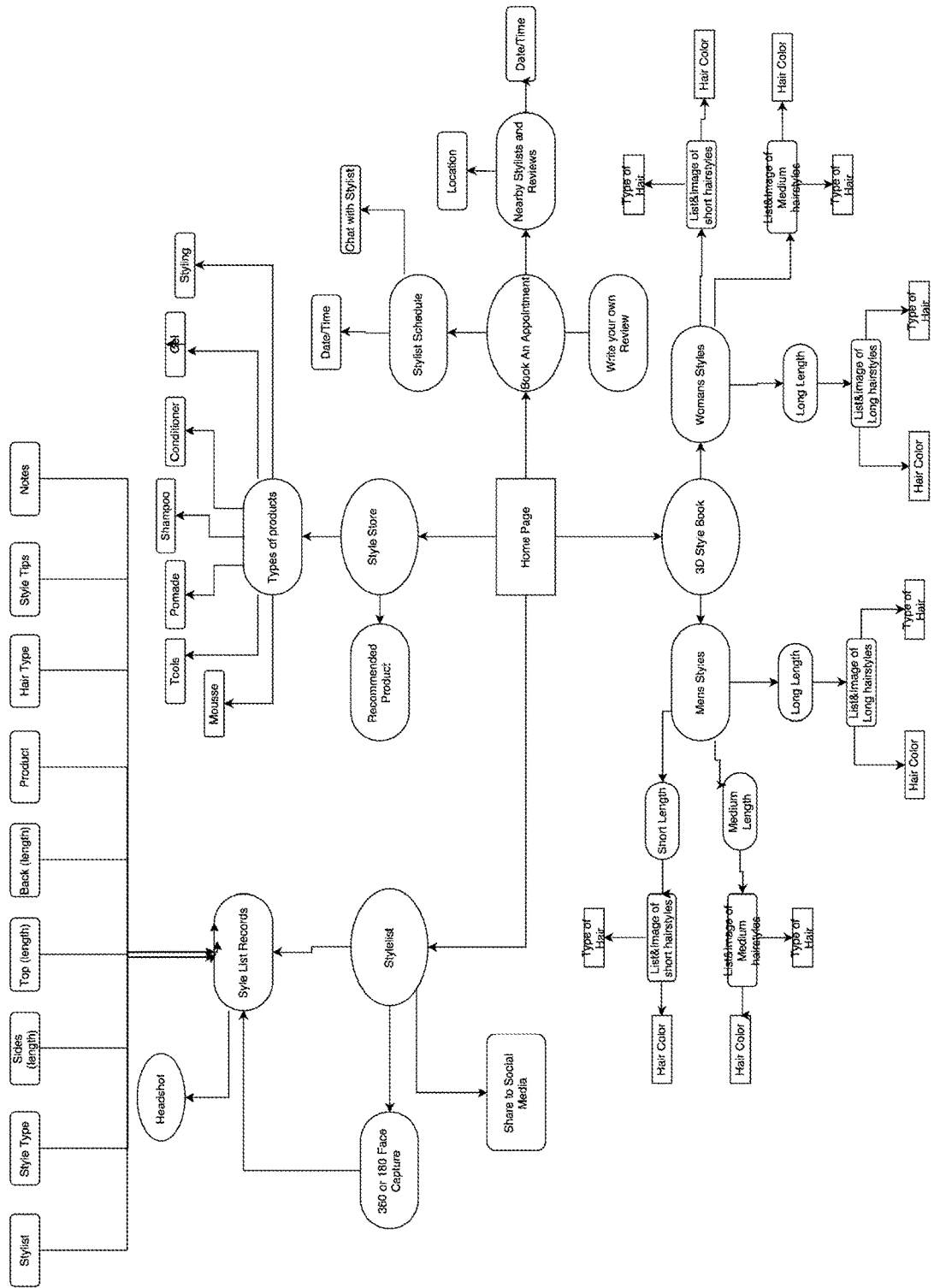
FIG. 8 is a schematic illustration of elements of an application for use with a system having one or more features consistent with the present description.

FIG. 8 is a schematic illustration of elements of an exemplary application for use with an exemplary system having one or more features consistent with the present description. It is to be understood that the schematic illustration of FIG. 8 can be adapted for other aesthetic expression applications outside of hair, including tattoo(s) on a user, clothes on a user, and the like. In some variations, a user can use the application to book an appointment with a stylist, a tattoo artist, or the like. The user can book an appointment with their own stylist or find a new stylist or a tattoo artist for a new tattoo with which to book an appointment. Users can sort stylist by location, rating, availability or the like. A companion application for the stylist can be provided that allows the stylist to manage their schedule. The companion application can facilitate communication between the stylist and the user.

The application can facilitate purchase of haircare products. Stylists can recommend haircare products based on a hairstyle they have given to the client and/or the products that they used on the user. Similarly, when a user selects a particular hairstyle that they would like to have, products that are typically used to create that hairstyle can be recommended to the user.

A user profile, such as the user profile described with respect to FIG. 7 can include a headshot of the user with the hairstyle that they selected. The user can upload the image to social media. The application can facilitate crowdsourcing of hairstyles that may be suitable for a particular user.

In some variations, the application can facilitate the stylist taking a photograph of the user after the user's hair has been styled. The photograph of the user can be stored in a database and associated with the user.

The application can facilitate the determination of various features of a hairstyle associated with a user and store those features of the hairstyle. For example, after a stylist has taken an image of the hairstyle of the user, the application can be configured to determine the length of the sides of the hair, the length of the back of the hair, the hair-type of the user, the style type selected, or the like. The application can take note of the stylist that styled the hair. When styling the user's hair, the stylist can take a note of the products used when styling the hair. The stylist can provide style tips for the user to follow when they get home.

In some variations, video data can be obtained while the user is having their hair styled and the application can be configured to facilitate playback of the video for the user to follow when applying product and/or styling their own hair.

In other embodiments, the application can facilitate the determination of various features of a tattoo associated with a user and store those features of the tattoo. For example, after a tattoo artist or the user has taken an image of a tattoo and/or a body part of the user, the application can be configured to determine dimensions and other stylized attributes of the tattoo, corresponding style type, or the like. The application can take note of the artist that drew and/or implemented the tattoo on the user.

The server 102 can include a processor (112). Processor(s) 112 can be configured to provide information processing capabilities to a computing device having one or more features consistent with the current subject matter. The computing device can be, for example, a smart phone 106, tablet 110, desktop 114, or the like. Processor 112 may include one or more of a digital processor, an analog processor, a digital circuit designed to process information, an analog circuit designed to process information, a state machine, and/or other mechanisms for electronically processing information. Although processor 112 is shown in FIG. 1 as a single entity, this is for illustrative purposes only. In some implementations, processor 112 may include a plurality of processing units. These processing units may be physically located within the same device, or processor 112 may represent processing functionality of a plurality of devices operating in coordination. For example, some of the functions of processor 112 may be performed by the mobile computing device 106, the server 102, other computing devices 110, 114, or the like. The processor 112 may be configured to execute machine-readable instructions, which, when executed by the processor 112 may cause the processor 112 to perform one or more of the functions described in the present description. The functions described herein may be executed by software; hardware; firmware; some combination of software, hardware, and/or firmware; and/or other mechanisms for configuring processing capabilities on processor 112.

Electronic storage 104 may comprise electronic storage media that electronically stores information. The electronic storage media of electronic storage 104 may include one or both of system storage that is provided integrally (i.e., substantially non-removable) with a computing 64046 device, such as a smartphone, tablet, smartwatch, desktop, server, or the like, and/or removable storage that is removably connectable to server xx via, for example, a port (e.g., a USB port, a firewire port, etc.) or a drive (e.g., a disk drive, etc.). Electronic storage 104 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage xx may include one or more virtual storage resources (e.g., cloud storage, a virtual private network, and/or other virtual storage resources). Electronic storage 104 may store software algorithms, information determined by processor 112, information received from one or more computing devices, such as server 102, client computing devices, such as mobile computing device 106, information that enables the one or more computing device to function, or the like.

In some variations, external resources 116 can provide additional information or add-on information. For example, the application executed on the mobile computing device 106 and/or supported by the server 102 can be configured to obtain product information from product manufacturers, hairstyle information from other stylists or celebrity stylists, or the like. In other embodiments, this information can relate to tattoos of a particular celebrity, tattoos by a particular artist (including well-known tattoo artists), an article of clothing for a celebrity (e.g., a dress worn by an actress at an event), an article of clothing by a particular company or fashion designer, an article of clothing suggested by a publication, jewelry worn by a celebrity, jewelry by a designer, or the like. This information can be obtained by the mobile computing device 106 and/or the server 102 from one or more external resources 116.

Figure 9:
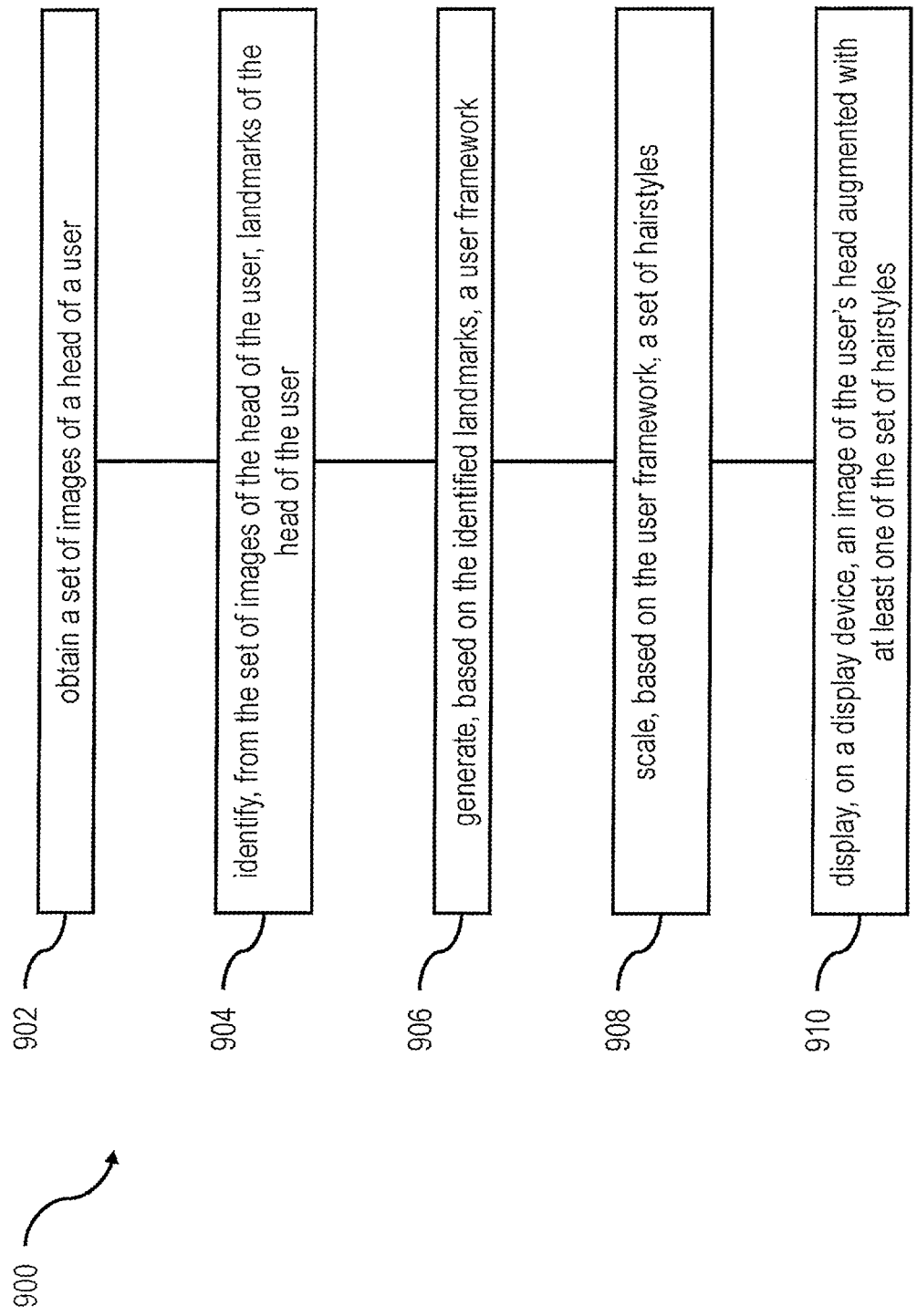
FIG. 9 illustrates a method 900 having one or more features consistent with the present description.

FIG. 9 illustrates a method 900 having one or more features consistent with the current subject matter. The operations of method 900 presented below are intended to be illustrative. In some embodiments, method 900 may be accomplished with one or more additional operations not described, and/or without one or more of the operations discussed. Additionally, the order in which the operations of method 900 are illustrated in FIG. 9 and described below is not intended to be limiting.

In some embodiments, method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At 902, a set of images of a body part, such as a head, can be obtained. The images can be obtained using one or more methods described herein, especially with reference to FIG. 2 and FIG. 3. In one variation, a user can use a camera of a mobile computing device, such as mobile computing device 106, to obtain the set of images of the body part of a user.

At 904, landmarks of the body part, such as the head, can be identified from the set of images of the head of the user. Landmarks of the head can include the user's ears, nose, eyes, eyebrows, chin, cheeks, neckline, hairline, or the like. The landmarks can be identified using image analysis. In other embodiments where the body part is something other than a head, the landmarks are defined according to the particular body part (e.g., where the body part is a hand, the landmark can include one or more of the fingers, palm, etc.). The identifying of the landmarks can be performed by the server 102, mobile computing device 106, or the like.

At 906, a user framework can be generated based on the identified landmarks. The user framework can include an indication of the relative size and position of the identified landmarks.

At 908, a set of aesthetic expressions (e.g., hairstyles) can be selected, adjusted, scaled, and/or otherwise customized based on the user framework. The hairstyles can be scaled so that the shape and size of the hairstyle can be matched to the shape and size and positions of the landmarks of the user's head. This can allow the set of hairstyles to be presented to the user on a display device in a manner where the hairstyles look natural on the user's head.

At 910, the image of the user's body party can be augmented with at least one of the set of hairstyles. The augmented image can be displayed on display device, such as a display of a mobile computing device. It is to be understood that the method illustrated in FIG. 9 is merely exemplary and other steps could be included. Method 900 can also be adapted for uses outside of the hairstyle space, including with other aesthetic expressions such as tattoos, clothes, jewelry not only about the head but with other body part(s) of the user.

Without in any way limiting the scope, interpretation, or application of the claims appearing herein, a technical effect of one or more of the example embodiments disclosed herein may include facilitating augmenting images of a user's head with different hairstyles.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" one or more of may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible. The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method to be performed by at least one computer processor forming at least a part of a computing system comprising a mobile computing device comprising a camera, the method comprising:
   obtaining a set of images of a head of a user by moving the mobile computing device through one or more two- and three-dimensional paths about the head;
   identifying, from the set of images, landmarks of the head of the user, wherein the landmarks comprise ears, nose, eyes, eyebrows, chin, cheeks, neckline, and hairline of the user;
   generating, based on the identified landmarks, a user framework;
   scaling and adjusting, based on the user framework, a set of hairstyles from a hairstyle database based on hair dimensions, characteristics, and color with the landmarks, the hairstyle database being synchronized with a user profile and based one or more hairstyle selections by the user;
   displaying, on a display device, an image of the user's head augmented with at least one set of hairstyles;
   synchronizing a user profile based on the user with a publicly and privately available database of hairstyles;
   saving, by the user through the mobile computing device, hairstyles to the user profile;
   accessing, by a hair stylist through a second mobile computing device, the user profile; and
   synchronizing, by the stylist, hair products, hair tools, and hairstyle selections of the user profile from hair appointments by the user;
   wherein criteria of the database comprise hairstyles of celebrities, social media, criteria of contacts within a network, and network suggested criteria based on user information.

2. The method of claim 1, further comprising:
   recommending, by the database, one or more hair products to the user based on the user profile and hairstyle selections by the user.

3. The method of claim 1, the step of moving the mobile computing device through one or more two- and three-dimensional paths about the head further comprises:
   presenting an instruction on the display device that causes the user to temporarily maintain the mobile computing device at one location relative to a predetermined location of the head; and
   temporarily positioning the camera of the mobile computing device towards the predetermined location to obtain the set of images.

4. The method of claim 1, further comprising:
   communicating an indication, by the mobile communications device, to the user regarding an output associated with analyzing the set of images and/or the hairstyle.

5. The method of claim 1, wherein the step of moving comprises:
   starting the moving of the mobile device behind a lateral midline of the head; and
   terminating the moving of the mobile device at a location different than the lateral midline of the head.

6. The method of claim 1, wherein the step of moving comprises:
   positioning the mobile device along a plurality of predetermined positions along a predetermined three-dimensional path.

7. The method of claim 6, wherein the plurality of positions are determined automatically by analyzing the set of images and identifying one or more landmarks of the head of the user.

8. The method of claim 1, further comprising:
stitching together the set of images; and
forming the user framework with a three-dimensional map of the user's head.

9. The method of claim 8, wherein the three-dimensional map comprises the landmarks detected by analyzing the set of images that are associated with the head.

10. The method of claim 9, wherein the three-dimensional map comprises a multicolor graphic with indicators associated with the one or more landmarks.

11. A method to be performed by at least one computer processor forming at least a part of a computing system comprising a mobile computing device comprising a camera, the method comprising:
obtaining a set of images of a head of a user by moving the mobile computing device through one or more two- and three-dimensional paths about the head;
identifying, from the set of images, landmarks of the head of the user, wherein the landmarks comprise ears, nose, eyes, eyebrows, chin, cheeks, neckline, and hairline of the user;
generating, based on the identified landmarks, a user framework;
scaling and adjusting, based on the user framework, a set of hairstyles from a hairstyle database based on hair dimensions, characteristics, and color with the landmarks, the hairstyle database being synchronized with a user profile and based one or more hairstyle selections by the user;
selecting, by the user, a hairstyle from the set of hairstyles;
displaying, on a display device, an image of the user's head augmented with at least one set of hairstyles;
synchronizing a user profile based on the user with a publicly and privately available database of hairstyles;
saving, by the user through the mobile computing device, hairstyles to the user profile;
accessing, by a hair stylist through a second mobile computing device, the user profile;
synchronizing, by the stylist, hair products, hair tools, and hairstyle selections of the user profile from hair appointments by the user;
wherein criteria of the database comprise hairstyles of celebrities, social media, criteria of contacts within a network, and network suggested criteria based on user information.

12. The method of claim 11, further comprising:
recommending, by the database, one or more hair products to the user based on the user profile and hairstyle selections by the user.

13. The method of claim 11, wherein selecting, by the user, is communicated in a graphical user interface of the display device.

14. The method of claim 11, wherein the method is stored in a set of instructions in a non-transitory computer readable storage medium of the computing system.

15. The method of claim 11, the step of moving the mobile computing device through one or more two- and three-dimensional paths about the head further comprises:
presenting an instruction on the display device that causes the user to temporarily maintain the mobile computing device at one location relative to a predetermined location of the head; and
temporarily positioning the camera of the mobile computing device towards the predetermined location to obtain the set of images.

16. The method of claim 11, wherein the step of moving comprises:
positioning the mobile device along a plurality of predetermined positions along a predetermined three-dimensional path.

17. The method of claim 16, wherein the plurality of positions are determined automatically by analyzing the set of images and identifying one or more landmarks of the head of the user.

18. The method of claim 11, further comprising:
stitching together the set of images; and
forming the user framework with a three-dimensional map of the user's head, the three-dimensional map comprising the landmarks detected by analyzing the set of images that are associated with the head.

* * * * *